(12) United States Patent
Neal et al.

(10) Patent No.: US 12,478,256 B2
(45) Date of Patent: Nov. 25, 2025

(54) SYSTEM AND METHOD FOR MODELING NEGATIVELY CORRELATED BRAIN EPILEPSY NETWORK

(71) Applicant: University of South Florida, Tampa, FL (US)

(72) Inventors: Elliot G. Neal, Tampa, FL (US); Fernando Vale, Tampa, FL (US)

(73) Assignee: University of South Florida, Tampa, FL (US)

( * ) Notice: Subject to any disclaimer, the term of this patent is extended or adjusted under 35 U.S.C. 154(b) by 1063 days.

(21) Appl. No.: 17/485,414

(22) Filed: Sep. 25, 2021

(65) Prior Publication Data
US 2022/0248959 A1     Aug. 11, 2022

Related U.S. Application Data

(60) Provisional application No. 63/198,043, filed on Sep. 25, 2020.

(51) Int. Cl.
*A61B 5/00* (2006.01)
*A61B 5/055* (2006.01)
(Continued)

(52) U.S. Cl.
CPC ............ *A61B 5/0042* (2013.01); *A61B 5/055* (2013.01); *A61B 5/372* (2021.01); *A61B 5/4094* (2013.01);
(Continued)

(58) Field of Classification Search
CPC ....... A61B 5/0042; A61B 5/055; A61B 5/372; A61B 5/4094; A61B 2576/026;
(Continued)

(56) References Cited

U.S. PATENT DOCUMENTS 10,588,561 B1    3/2020 Vale et al.
2010/0286747 A1    11/2010 Sabesan et al.
(Continued)

OTHER PUBLICATIONS

Neal EG, Maciver S, Vale FL. Multimodal, noninvasive seizure network mapping software: A novel tool for preoperative epilepsy evaluation. Epilepsy Behav. Apr. 2018;81:25-32. doi: 10.1016/j.yebeh.2018.01.033. Epub Feb. 22, 2018. PMID: 29459252. (hereinafter—Neal) (Year: 2018).*
(Continued)

*Primary Examiner* — Justin Xu
(74) *Attorney, Agent, or Firm* — Meunier Carlin & Curfman LLC

(57) ABSTRACT

System and method for processing, non-concurrently collected, electroencephalogram (EEG) data and resting state functional magnetic resonance imaging (rsfMRI) data, noninvasively, to create a patient-specific three-dimensional (3D) mapping of the patient's functional brain network. The mapping can be used to more precisely identify candidates of resective neurosurgery and to help create a targeted surgical plan for those patients. The methodology automatically maps the patient's unique brain network using non-concurrent EEG and resting state functional MRI (rsfMRI). Generally, the current invention merges EEG data and rsfMRI data to map the patient's epilepsy/seizure network. Correlated sections of the brain and inversely correlated sections of the brain are identified to determine which sections of the brain work in conjunction with each other and which sections work oppositely to each other during epileptic episodes.

18 Claims, 8 Drawing Sheets

(51) Int. Cl.
  *A61B 5/372*  (2021.01)
  *G01R 33/48*  (2006.01)
  *G01R 33/56*  (2006.01)
  *G06T 7/00*  (2017.01)

(52) U.S. Cl.
  CPC ..... *G01R 33/4806* (2013.01); *G01R 33/5608* (2013.01); *G06T 7/0012* (2013.01); *A61B 2576/026* (2013.01); *G06T 2207/10088* (2013.01); *G06T 2207/30016* (2013.01)

(58) Field of Classification Search
  CPC ..... A61B 5/384; A61B 5/4064; A61B 5/7246; G01R 33/4806; G01R 33/5608; G06T 7/0012; G06T 2207/10088; G06T 2207/30016
  See application file for complete search history.

(56) References Cited

U.S. PATENT DOCUMENTS

2014/0107521 A1  4/2014  Galan
2018/0240549 A1  8/2018  Terry et al.

OTHER PUBLICATIONS

Bartolomei F, Wendling F, Chauvel P. [The concept of an epileptogenic network in human partial epilepsies] Neurochirurgie. May 2008;54:174-184.

Bell ML, Rao S, So EL, Trenerry M, Kazemi N, Stead SM, et al. Epilepsy surgery outcomes in temporal lobe epilepsy with a normal MRI Epilepsia. Sep. 2009;50:2053-2060.

Bernhardt BC, Hong S, Bernasconi A, Bernasconi N. Imaging structural and functional brain networks in temporal lobe epilepsy Front Hum Neurosci. Oct. 1, 2013;7:624.

Blumenfeld H, McNally KA, Vanderhill SD, Paige AL, Chung R, Davis K, et al. Positive and negative network correlations in temporal lobe epilepsy Cereb Cortex. Aug. 2004;14:892-902.

Chauvel P, Gonzalez-Martinez J, Bulacio J. Presurgical intracranial investigations in epilepsy surgery Handb Clin Neurol. 2019;161:45-71.

Engel J, Jr., McDermott MP, Wiebe S, Langfitt JT, Stern JM, Dewar S, et al. Early surgical therapy for drug-resistant temporal lobe epilepsy: a randomized trial JAMA. Mar. 7, 2012;307:922-930.

Gonzalez HFJ, Chakravorti S, Goodale SE, Gupta K, Claassen DO, Dawant B, et al. Thalamic arousal network disturbances in temporal lobe epilepsy and improvement after surgery J Neurol Neurosurg Psychiatry. Oct. 2019;90:1109-1116.

Jehi L, Yardi R, Chagin K, Tassi L, Russo GL, Worrell G, et al. Development and validation of nomograms to provide individualised predictions of seizure outcomes after epilepsy surgery: a retrospective analysis Lancet Neurol. Mar. 2015;14:283-290.

Junges, Leandro, et al. "The role that choice of model plays in predictions for epilepsy surgery." Scientific reports 9.1 7351 (2019): 1-12.

Kwan P, Brodie MJ. Early identification of refractory epilepsy N Engl J Med. Feb. 3, 2000;342:314-319.

Li Q, Cao W, Liao X, Chen Z, Yang T, Gong Q, et al. Altered resting state functional network connectivity in children absence epilepsy J Neurol Sci. Jul. 15, 2015;354:79-85.

Luo C, Yang F, Deng J, Zhang Y, Hou C, Huang Y, et al. Altered functional and effective connectivity in anticorrelated intrinsic networks in children with benign childhood epilepsy with centrotemporal spikes Medicine (Baltimore). Jun. 2016;95:e3831.

McGill ML, Devinsky O, Kelly C, Milham M, Castellanos FX, Quinn BT, et al. Default mode network abnormalities in idiopathic generalized epilepsy Epilepsy Behav. Mar. 2012;23:353-359.

Morgan VL, Gore JC, Abou-Khalil B. Functional epileptic network in left mesial temporal lobe epilepsy detected using resting fMRI Epilepsy Res. Feb. 2010;88:168-178.

Morgan VL, Rogers BP, Gonzalez HFJ, Goodale SE, Englot DJ. Characterization of postsurgical functional connectivity changes in temporal lobe epilepsy J Neurosurg. Jun. 14, 2019:1-11.

Neal EG, Di L, Reale-Caldwell A, Maciver S, Schoenberg MR, Vale FL. Network connectivity separate from the hypothesized irritative zone correlates with impaired cognition and higher rates of seizure recurrence Epilepsy Behav. Dec. 2019;101:106585.

Neal EG, Maciver S, Schoenberg MR, Vale FL. Surgical disconnection of epilepsy network correlates with improved outcomes Seizure. Jan. 29, 2020;76:56-63.

Neal EG, Maciver S, Vale FL. Multimodal, noninvasive seizure network mapping software: A novel tool for preoperative epilepsy evaluation Epilepsy Behav. Apr. 2018;81:25-32.

Sander JW. The epidemiology of epilepsy revisited Curr Opin Neurol. Apr. 2003;16:165-170.

Schramm J. Temporal lobe epilepsy surgery and the quest for optimal extent of resection: a review Epilepsia. Aug. 2008;49:1296-1307.

Shen X, Tokoglu F, Papademetris X, Constable RT. Groupwise whole-brain parcellation from resting-state fMRI data for network node identification Neuroimage. Nov. 15, 2013;82:403-415.

Sinha, Nishant, et al. "Predicting neurosurgical outcomes in focal epilepsy patients using computational modelling." Brain 140.2 (2017): 319-332.

Spencer SS, Berg AT, Vickrey BG, Sperling MR, Bazil CW, Shinnar S, et al. Predicting long-term seizure outcome after resective epilepsy surgery: the multicenter study Neurology. Sep. 27, 2005;65:912-918.

Uddin LQ, Kelly AM, Biswal BB, Castellanos FX, Milham MP. Functional connectivity of default mode network components: correlation, anticorrelation, and causality Hum Brain Mapp. Feb. 2009;30:625-637.

Vale FL, Effio E, Arredondo N, Bozorg A, Wong K, Martinez C, et al. Efficacy of temporal lobe surgery for epilepsy in patients with negative MRI for mesial temporal lobe sclerosis J Clin Neurosci. Jan. 2012;19:101-106.

Van den Heuvel M, Mandl R, Hulshoff Pol H. Normalized cut group clustering of resting-state FMRI data PLoS One. Apr. 23, 2008;3:e2001.

Wiebe S, Blume WT, Girvin JP, Eliasziw M, Effectiveness, Efficiency of Surgery for Temporal Lobe Epilepsy Study G. A randomized, controlled trial of surgery for temporal-lobe epilepsy N Engl J Med. Aug. 2, 2001;345:311-318.

Zhang Z, Lu G, Zhong Y, Tan Q, Liao W, Wang Z, et al. Altered spontaneous neuronal activity of the default-mode network in mesial temporal lobe epilepsy Brain Res. Apr. 6, 2010;1323:152-160.

\* cited by examiner

SYSTEM AND METHOD FOR MODELING NEGATIVELY CORRELATED BRAIN EPILEPSY NETWORK

CROSS-REFERENCE TO RELATED APPLICATIONS

This application claims the benefit of priority to U.S. Provisional Patent Application Ser. No. 63/198,043, filed on Sep. 25, 2020, the disclosure of which is incorporated herein by reference in its entirety.

TECHNICAL FIELD

This disclosure relates to digitally modeling a patient's brain with a computer and more particularly to modeling portions of the brain that generate electrical signal activity oppositely to those sections of the brain subject to epilepsy and epileptic activity during epileptic seizures and between epileptic seizures.

BACKGROUND

Epilepsy is one of the most common neurologic disorders, with prevalence of 0.5%-1%. Current data show that epilepsy in 20%-30% of patients is refractory to medical therapy and these patients are therefore possible candidates for resective neurosurgery.

Surgical candidates are evaluated using magnetic resonance imaging (MRI) to evaluate brain structure and electroencephalograph (EEG) to identify and localize ictal (i.e. seizure activity) and interictal activity (i.e., activity between seizures). These two techniques are the most common ways to identify epileptic foci for targeted resection. Wada testing, functional MRI (fMRI) and neuropsychological evaluation are used to determine laterality of speech and memory function to minimize morbidity. Despite rigorous pre-surgical evaluation, resective surgery achieves seizure freedom in only two-thirds of cases, so one-third of patients still suffer from seizures post-surgery. Increasing the effectiveness of surgery will most likely either come from more accurate and precise surgical target mapping or more specific identification of candidates who will be responsive to surgery.

Epilepsy has recently been reimagined as a network-level disorder, which may explain why many patients fail focal resection. Alteration of global brain networks, mapped using graph theory techniques, has been shown in patients with epilepsy. Network-level alterations are characterized by decreased connectivity globally, decreased connection to the default-mode network and increased small-world network segregation in the region of epileptogenic tissue. Recent studies have demonstrated the value of resting state functional MRI (rsfMRI) in mapping brain networks. The epileptogenic cortex can be identified by applying EEG, source localization algorithms Despite recent improvements in technology, no generally available method is capable of mapping the network-level disturbances resulting from epileptic discharges using conventional hardware, which includes MRI and scalp EEG. More specifically, evidence shows that network-level disturbances resulting from epileptic discharges may explain why some patients do not respond to surgery. However, current assessments do not evaluate the individual network architecture and no tool exists that automatically maps each patient's brain network. As such, current preoperative evaluation does not include a detailed network analysis despite the association of network-level changes with epilepsy.

Epilepsy surgery is ineffective in as many as ⅓ of patients, and recent research supports the notion that patients who do not improve after surgery have a seizure network that is distributed across the brain and resistant to disconnection. However, there is no commercially available software for generating images of those networks for clinicians to use. Non-commercial software packages that do exist rely on invasive monitoring or expensive techniques which are prohibitive in most cases of epilepsy surgery. Our previous invention described a non-invasive technique for mapping the positively correlated seizure network, which is an aberrant network that needs to be disconnected to control seizures and mitigate their deleterious effect on normal cognition. Here, the negatively correlated epilepsy network is described as a separate but related invention that will be important for epilepsy surgery. The negatively correlated epilepsy network may be a beneficial network that inhibits seizure propagation and supports the functional networks involved in memory and executive function. This invention is a software algorithm that automatically maps the negatively correlated epilepsy network using non-invasive surface electroencephalography and resting state functional MRI in a way that has never been done before.

Accordingly, what is needed is a system and method for mapping individualized epilepsy networks. Furthermore, a software algorithm is needed that can be used to plan surgeries that most effectively disconnect the mapped network. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

A computerized method of modeling a human brain includes acquiring electroencephalogram (EEG) data corresponding to the human brain and additionally acquiring resting state functional magnetic resonance imaging (rsfMRI) data corresponding to the human brain. The method continues by identifying ictal source discharges and interictal source discharges within the EEG data from respective regions of the human brain. The method has a step of tagging predicted source volumes of epileptogenic zones from the respective regions of the human brain and co-registering the predicted source volumes to the rsfMRI data. The computerized method continues by extracting time signatures from selected rsfMRI data corresponding to the predicted source volumes. The method also includes generating a Pearson correlation coefficient for image voxels from the selected rsfMRI data corresponding to the predicted source volumes and generating an inverse epilepsy network comprising image voxels in which the Pearson correlation coefficient is below a threshold value.

In a system used to model a human brain, the system may include an epilepsy monitoring unit storing electroencephalogram (EEG) data in computerized memory, wherein the EEG data corresponds to electrical impulses in the human brain. The system also includes a magnetic resonance imaging machine storing resting state functional magnetic resonance imaging (rsfMRI) data in respective computerized memory, wherein the rsfMRI data corresponds to the human brain. The rsfMRI data may be T1 image data. At least one computer processor is in electronic communication with the computerized memory storing the EEG data and the respective computerized memory storing the rsfMRI data. The processor accesses software to perform a computerized method having the steps of identifying ictal source discharges and interictal source discharges within the EEG data from respective regions of the human brain; tagging predicted source volumes of epileptogenic zones from the respective regions of the human brain; co-registering the predicted source volumes to the rsfMRI data; extracting time signatures from selected rsfMRI data corresponding to the predicted source volumes; generating a Pearson correlation coefficient for image voxels from the selected rsfMRI data corresponding to the predicted source volumes; and generating an inverse epilepsy network comprising image voxels in which the Pearson correlation coefficient is below a threshold value.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1A:
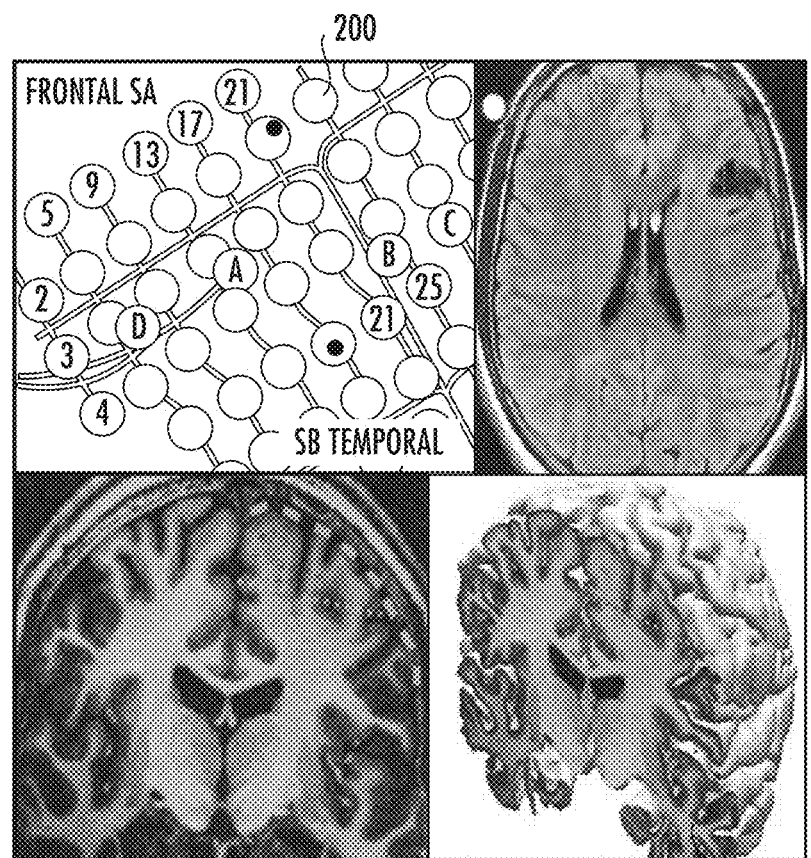
FIG. 1A shows a PRIOR ART intracranial EEG assembly as described in this disclosure.

This disclosure explains how the network consisting of brain regions negatively correlated with an epileptogenic zone of an animal brain may have characteristics that can be used in surgical planning or to predict which patients with refractory temporal lobe epilepsy will respond best to surgery.

Epilepsy is a common primary neurological disorder that affects 0.5-1% of the global population, of which 20-30% are refractory to medical management (1, 2). For those patients who are refractory to medication, the next line of therapy involves some type of surgical intervention. If the epilepsy is focal and the epileptogenic zone can be localized to a temporal lobe using conventional techniques, which include electroencephalography (EEG), MRI, $^{18}$Fluoro-2-deoxyglucose positron emission tomography (($^{18}$F-FDG) PET), semiology, and neuropsychological testing, then a surgery can be planned to resect or ablate the hypothesized focus and disconnect the epileptogenic network. Surgeries that have been used to treat temporal lobe epilepsy include anterior temporal lobectomy, selective amygdalohippocampectomy, temporal lobectomy with amygdalectomy and minimal hippocampal resection, and stereotactic laser amygdalohippocampotomy (SLAH) (3). Resective surgeries in the temporal lobe have been shown to result in seizure freedom in approximately two-thirds of patients, and an improved quality of life when compared to medical management alone (4-7). However, this still leaves the one-third of patients who undergo surgery in their temporal lobe who continue to have debilitating seizures.

This disclosure shows the patterns of connectivity within a newly defined "negatively correlated epilepsy network" in patients with refractory temporal lobe epilepsy undergoing surgery. In the network, defined as those areas of the brain that had a below-threshold negative Pearson correlation with a hypothesized epileptogenic zone estimated from surface EEG, interconnectivity was directly related to pre-operative performance on objective neuropsychological evaluation of verbal and logical memory. Also, pre-operative negatively correlated epilepsy network connectivity was directly related to the likelihood of being seizure-free after surgery. These findings together suggest a benefit to the patient both pre- and post-operatively if they had a highly connected negatively correlated epilepsy network, which can be determined using commonly available, non-invasive methods (EEG and rsfMRI). These data represent a step towards proving the efficacy of non-invasive network mapping and should stimulate future exploration into the utility and value of such an algorithm in predicting outcomes after surgery.

The field of individualized network analysis is still in its infancy and potential uses of this technology can be categorized into three broad categories: diagnosis of epilepsy, identification of surgical candidates, and localization of surgical resection targets. Supporting evidence for the first category includes studies showing connectivity parameters from rsfMRI and EEG synchronicity used to create "biomarkers" for diagnosis of epilepsy and measure the progression of the seizure-related atrophy. For the second category, network asynchrony local to the epileptogenic focus and network correlation similarities with the retrospective cohort of patients with Engel class III-IV outcomes post-surgery, have been used to prospectively identify ideal candidates who will have the best outcomes after surgery. Finally, surgical targeting and resection of functional hubs, or network relay points, have been correlated with better surgical outcomes.

In accordance with various embodiments of the present invention, scalp EEG data and rsfMRI data are acquired from a patient, non-concurrently. Data from the rsfMRI is then preprocessed and a time-series function is extracted. Connection coefficients are then used to threshold out spurious connections and to thereby model global functional networks in a 3D map. Epileptic discharges were from the EEG data are localized using a forward model or cortical mesh dipoles followed by an empirical Bayesian approach of inverse source reconstruction, which are then co-registered with the rsfMRI time series function, thereby mapping co-activating brain regions.

Network modeling may be a valuable tool that can improve resection targeting and network disconnection and thus the efficacy of temporal lobe epilepsy surgery. Brain regions positively correlated with the epileptogenic zone have been associated with seizure recurrence and cognitive impairment, but negatively correlated regions have not been as well studied.

Network mapping is made possible by taking measurements of brain activity over time and interpreting the data using a combination of correlation analysis, causality analysis and graph-theory mapping techniques that implement correlation and/or causation to create a directed or non-directed graph. Noninvasive scalp EEG is a sensitive modality to detect epileptiform discharges and has unmatched temporal resolution. However, it is characteristically limited in spatial accuracy because of the dampening effects of the brain, cerebrospinal fluid (CSF), bone and skin. Comparatively, rsfMRI has better spatial resolution buts lacks the temporal resolution needed to localize propagation patterns of ictal or interictal discharges. The present invention overcomes the deficiencies in these two techniques of network mapping, by combining the two datasets to maximize the benefits and minimize the drawbacks of both technologies. While concurrently measured EEG and rsfMRI have been used to map brain connectivity, the specialized hardware required is not commonly available. Stereoencephalography (SEEG) has been used in connectivity studies to dramatically improve the spatial accuracy of EEG measurements. However, SEEG is necessarily an invasive measurement tool and is therefore not appropriate for all patients with epilepsy.

In various embodiments, the present invention processes electroencephalogram (EEG) data and magnetic resonance imaging (MRI) data noninvasively to create a patient-specific three-dimensional (3D) image that can be used to more precisely identify candidates for resective neurosurgery and to help create a targeted surgical plan for those patients. The methodology maps the patient's unique brain network using nonconcurrent EEG and resting state functional MRI (rsfMRI). Generally, the present invention merges nonconcurrent EEG data and rsfMRI data to map the patient's epilepsy/seizure network. Nonconcurrent data facilitates collection of data from the patient and makes this data more widely available since it does not require the patient to be in the MRI scanner for long periods of time.

The present invention provides a system and method that co-registers nonconcurrent scalp EEG and rsfMRI data to create a 3D network map of each patient with epilepsy. The data from the scalp EEG and the rsfMRI are acquired nonconcurrently so that the method is optimized for analysis of data collected on commonly available scalp EEG and diagnostic MRI machines.

The following terms may be referred to in their abbreviated acronym forms:
$^{18}$Fluoro-2-deoxyglucose positron emission tomography (($^{18}$F-FDG) PET)
Blood oxygenation level dependent (BOLD)
Boston Naming Test (BNT)
Controlled Oral Word Association Test (COWAT-FAS)
Electrocorticography (ECoG)
Electroencephalography (EEG)
Epilepsy Monitoring Unit (EMU)
Montreal Neurological Institute (MNI)
Resting state functional MRI (rsfMRI)
Rey Auditory Verbal Learning Test, Trial 6 (RAVLT6)
Rey Auditory Verbal Learning Test, Trial 7 (RAVLT7)
Ruff Figural Fluency Test-unique designs (RFFT)
Temporal lobe epilepsy (TLE)
Wechsler Adult Intelligence Scale-$4^{th}$ Ed.—Full Scale Intelligence Quotient
(FSIQ) Wechsler Memory Scale-$4^{th}$ Ed., Logical Memory Immediate recall subtest (LM-I)
Wechsler Memory Scale-$4^{th}$ Ed., Logical Memory Delayed recall subtest (LM-II)
Wechsler Memory Scale-$4^{th}$ Ed., Visual Reproduction Immediate Recall subtest (VR-I)
Wechsler Memory Scale-$4^{th}$ Ed., Visual Reproduction Delayed Recall subtest (VR-II).

Epilepsy is a common primary neurological disorder that affects 0.5-1% of the global population, of which 20-30% are refractory to medical management (1, 2). For those patients who are refractory (i.e., non-responsive or resistant) to medication, the next line of therapy involves some type of surgical intervention. If the epilepsy is focal and the epileptogenic zone can be localized to a temporal lobe using conventional techniques, which include electroencephalography (EEG), MRI, $^{18}$Fluoro-2-deoxyglucose positron emission tomography (($^{18}$F-FDG) PET), semiology, and neuropsychological testing, then a surgery can be planned to resect or ablate the hypothesized focus and disconnect the epileptogenic network. Surgeries that have been used to treat temporal lobe epilepsy include anterior temporal lobectomy, selective amygdalohippocampectomy, temporal lobectomy with amygdalectomy and minimal hippocampal resection, and stereotactic laser amygdalohippocampotomy (SLAH) (3). Resective surgeries in the temporal lobe have been shown to result in seizure freedom in approximately two-thirds of patients, and an improved quality of life when compared to medical management alone (4-7). However, this still leaves the one-third of patients who undergo surgery in their temporal lobe who continue to have debilitating seizures.

When seizures recur, or are insufficiently controlled following surgery, it is commonly assumed that the surgical intervention was insufficient to resect, ablate, or disconnect the epileptogenic brain region(s). This problem may arise when the epileptogenic zone is knowingly spared due to concerns for post-operative neurocognitive or neurological function, or when the epileptogenic zone is incompletely evaluated by the pre-operative work-up. To wit, several authors have proposed a network model for epilepsy, whereby the pre-operative work-up is directed towards elucidating the connectivity within and extent of the epileptogenic network which is both necessary and sufficient for post-operative seizure control, as well as the relationship of this network with networks underlying neurocognitive function (8-11). Typically, this consists of invasive monitoring using intracranial EEG depth electrodes 200 of FIG. 1A (12). However, such studies are labor-intensive, take time, and carry an inherent risk, leading to efforts to devise non-invasive strategies for modelling epilepsy-related functional networks that can be used to predict who is more likely to be relieved of seizures.

Figure 1B:
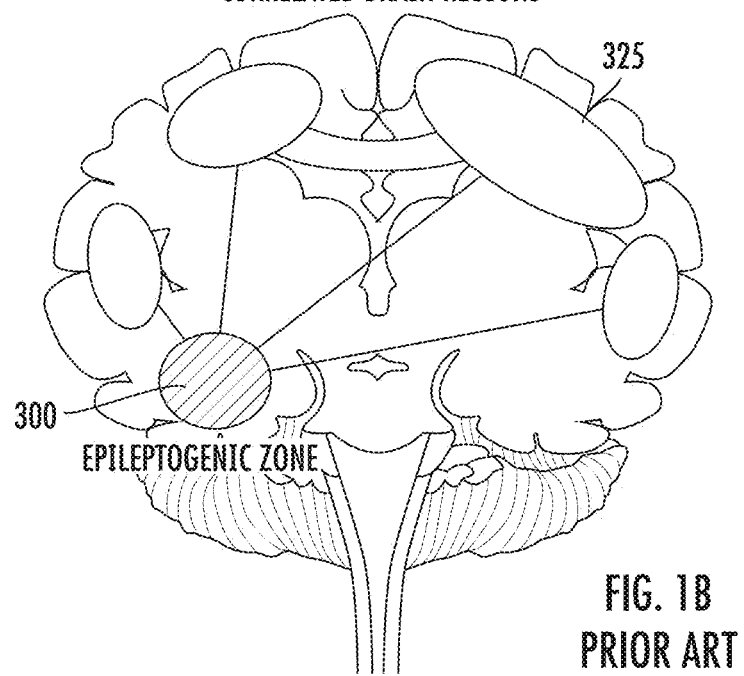
FIG. 1B shows a PRIOR ART schematic diagram showing an epileptogenic zone of a human brain and a positively correlated epilepsy network as described in this disclosure.
Figure 5:
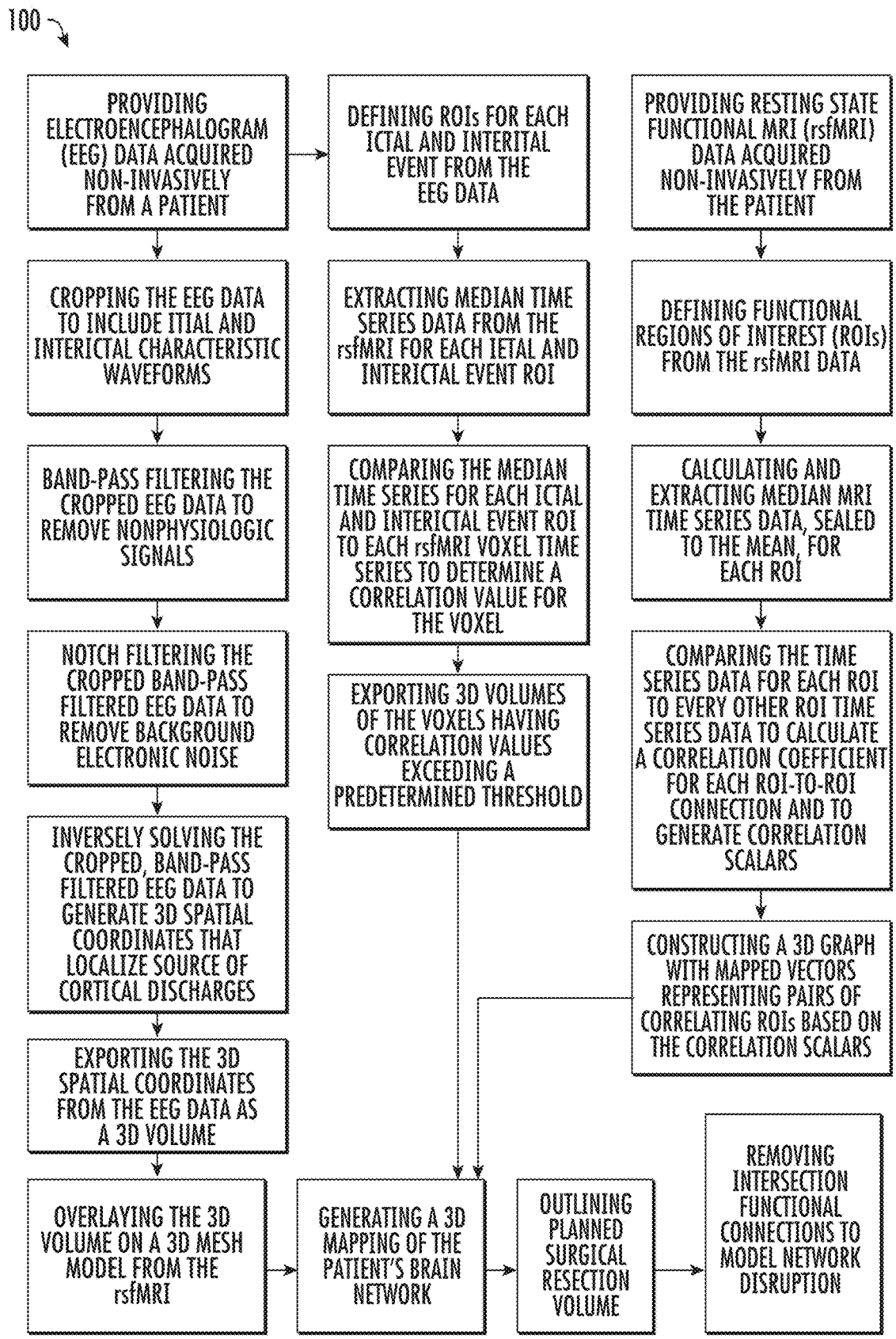
FIG. 5 is a PRIOR ART flow chart showing how a model of the brain can be created to show negatively and positively correlated networks relative to an epileptogenic zone.

This disclosure incorporates by reference U.S. Pat. No. 10,588,561 that disclosed a network modeling algorithm that uses rsfMRI and surface EEG to generate a hypothesized epileptogenic zone 300 non-invasively as shown in FIG. 1B. This prior art algorithm 100 is set forth herein in FIG. 5. The systems and methods of this prior work then generated a positively correlated network 325 of other regions with activation patterns that have a high degree of positive correlation with the epileptogenic zone in patients with temporal lobe epilepsy (13). With this model, the disclosure showed that the degree of spread of this positively correlated "epilepsy network" 325 in patients with TLE was associated with relatively worse outcomes both in rates of seizure freedom and in measures of cognition including executive function and verbal memory (14). Furthermore, this prior patent U.S. Pat. No. 10,588,561 showed that greater disconnection of this network after surgery was associated with a higher likelihood of seizure freedom (15). These results suggest that the positively correlated epilepsy network may be associated with impaired cognition in patients with temporal lobe epilepsy and that disconnection of this network may impede the generation and propagation of seizures. Thus far, prior to the disclosure below, the only network that studied is the positively correlated epilepsy network.

A positive correlation in activation patterns indicates that one or more brain regions are likely connected in some way. However, the opposite case may also be true: negatively correlated brain regions may also be functionally connected. For example, if a particular neuron or group of neurons has an inhibitory effect on its target, then every time the first neuron fires then the target would fire less frequently. Therefore, a positive activation in one region would be directly associated with a deactivation in the connected area. Mathematically, this can be determined as a negative correlation value (Pearson correlation coefficient<0). Negative correlation between nodes of the DMN (default mode network) have been observed with relation to task positive networks in healthy patients (16). Negative correlation has, for the most part, been studied in relation to generalized epilepsies, with findings being mostly related to the behavior of the DMN. Antagonism between the dorsal attention network, salience network, and DMN was shown to be related to impaired executive and attention function in patients with absence seizures (17). A similar relationship between the task positive network and the DMN in children with benign childhood epilepsy with centrotemporal spikes was found when compared to a control group (18). Patients with idiopathic generalized epilepsy have been found to have segregation and negative correlation between regions of the DMN (19).

Figure 1C:
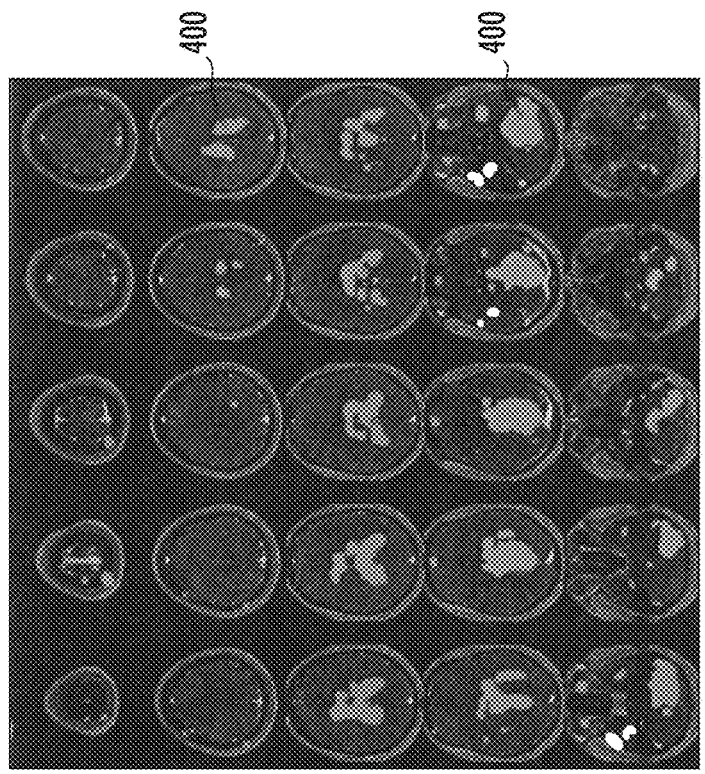
FIG. 1C shows one patient (cohort #5) who was not seizure free after surgery in the example embodiments of this disclosure.
Figure 1D:
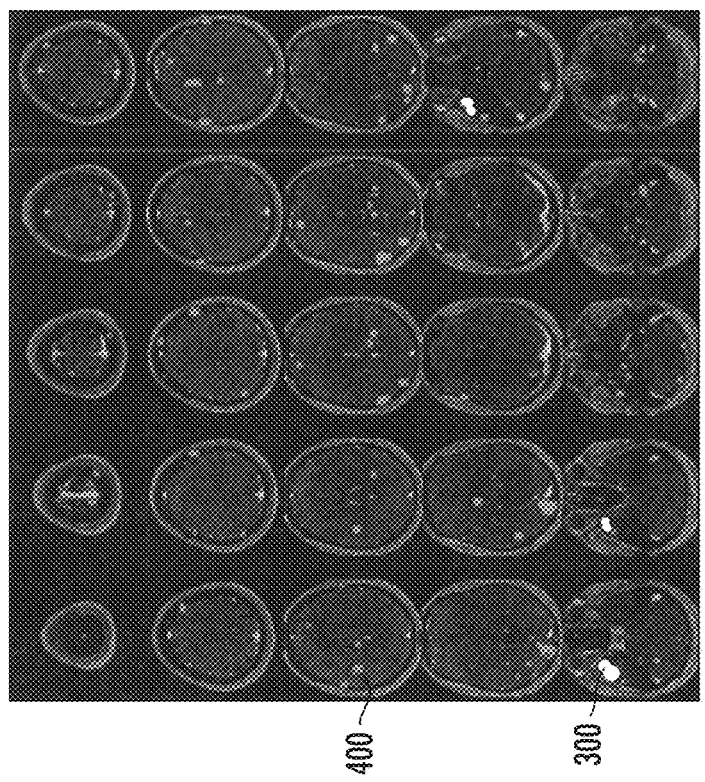
FIG. 1D shows the other patient (cohort #15) who was seizure free. The negatively correlated network is shown in green, and the hypothesized epileptogenic zone, generated from surface EEG, is shown in red.
Figure 1E:
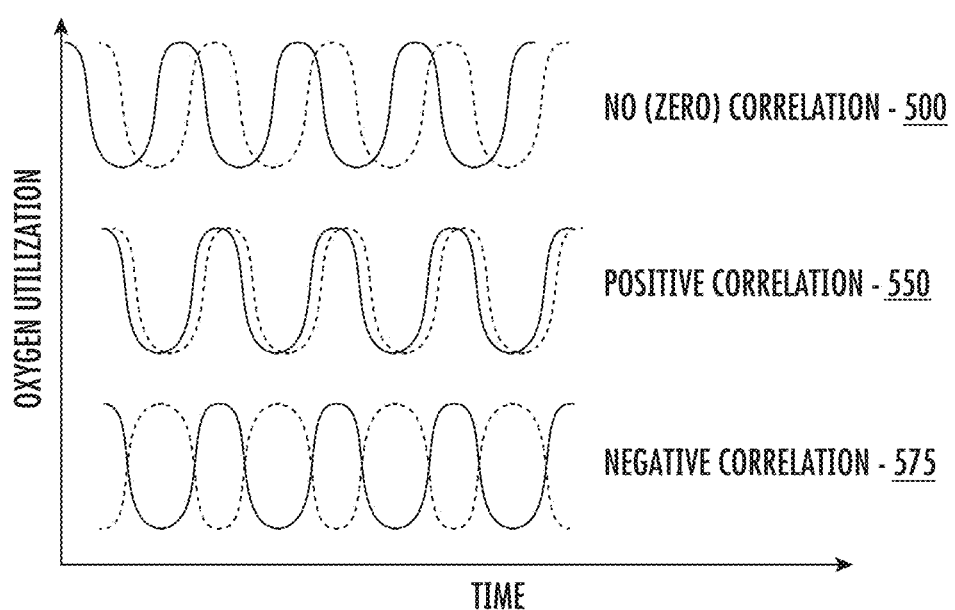
FIG. 1E shows brain activity signals of an epileptogenic zone and associated positive correlation, negative correlation, and no correlation to other regions of the brain.

FIG. 1E illustrates brain activity signals having numerous phases that illustrate no correlation 500, positive correlation 550, and negative correlation 575. In temporal lobe epilepsy, network studies utilizing negative correlation have shown decreased connectivity in the temporal lobes and a compensatory increase in the default mode network connectivity over time (20). In a SPECT-based network study in temporal lobe epilepsy examining the positive and negative network correlations, the authors found that alterations in consciousness during seizures were associated with increased cerebral blood flow (CBF) in the temporal lobes and midline subcortical structures, which was negatively correlated with CBF in the frontal and parietal association cortices (21). In a small study of patients who underwent surgery for temporal lobe epilepsy, a similar result was found. rsfMRIs performed in these patients demonstrated a negative correlation between the temporal lobe and widespread cortical and subcortical regions compared to controls 22. These regions included the thalamus, brainstem, frontal regions, and parietal regions, whereas the control group did not have this same widespread network of negatively correlated regions.

In the current study the details of this disclosure hypothesize that the network consisting of brain regions negatively correlated with the epileptogenic zone 300 may have characteristics that can be used to plan surgery or predict who will best respond to temporal lobe surgery in patients with refractory temporal lobe epilepsy.

In this paper and in FIGS. 1C, 1D, 1E, the "negatively correlated epilepsy network" 400 is a novel network that is negatively correlated with the epileptogenic zone 300 in 19 patients with temporal lobe epilepsy who underwent open microsurgery. Pre-operatively, researchers found that patients with highly interconnected negatively correlated epilepsy networks, i.e., an inverse epilepsy network 400, were more likely to have higher baseline verbal and logical memory. Furthermore, the same network was more highly interconnected in patients that would go on to be seizure free after epilepsy surgery. It was shown that this simple, non-invasive test may be useful as a prognostic test to predict seizure freedom.

This inverse epilepsy network 400 consists of a group of brain regions that are unique in that they have a negatively correlated rsfMRI signature compared to the time series of the epileptogenic zone 300 as determined based on the irritative zone identified on the pre-operative scalp EEG. This disclosure has previously described a positively correlated "epilepsy network" 325, defined as the network of regions with activation patterns that have a high degree of positive correlation 550 with the epileptogenic zone 300 in patients with temporal lobe epilepsy, and researchers hypothesized that the negatively correlated regions, i.e., the inverse epilepsy network 400, might be similarly important in understanding the brain function of the patient with temporal lobe epilepsy. In a previous study, whereas the spread of the positively correlated network 325 was associated with worse baseline function, baseline connectivity within the network was not predictive of which patients would benefit from surgery. The degree of disconnection in that network after surgery was, however, associated with more seizure free outcomes. In contrast, the data presented in the current study suggest that baseline connectivity within the negatively correlated epilepsy network (inverse epilepsy network 400) help to select patients who are most likely benefit from temporal lobe surgery.

Figure 2:
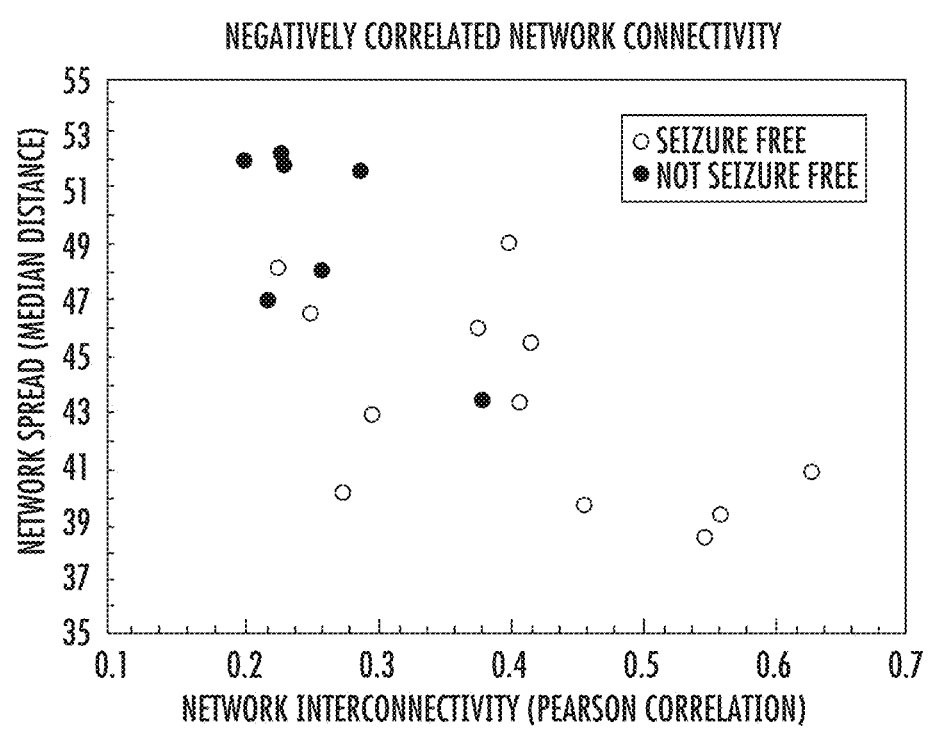
FIG. 2 illustrates the relationship between the spread of the negatively correlated epilepsy network and the interconnectivity of that network is shown. The interconnectivity of the negatively correlated epilepsy network is inversely related to the spread of the network.

A negative correlation 575, represented by a negative Pearson correlation value, has been associated with brain regions that act antagonistically (16). Therefore, it is possible that the negatively correlated epilepsy network that is more interconnected may antagonize the function of the epileptogenic zone in a way that benefits the patient both pre- and post-operatively. FIG. 2 illustrates results accordingly. Perhaps the negatively correlated network acts opposed to the epileptogenic zone during inter-ictal periods and controls the negative effect that the aberrant activity in the epileptogenic zone have on normal cognition. This may explain why our cohort of patients with TLE had improved performance on neuropsychological evaluations (specifically in memory and executive function) that scaled directly with the degree of connectivity within the negatively correlated network.

Since higher connectivity within the negatively correlated epilepsy network was associated with a higher likelihood of seizure freedom post-operatively, the prognostic value of this single metric was also investigated. Within one example cohort, an average connectivity within the negatively correlated epilepsy network of 0.2728 predicts seizure freedom with a specificity of 71% and a sensitivity of 79%. Clinically, this tool is non-invasive and easy to use. The negatively correlated network is created automatically with standard EEG and MRI technology that is available during a normal phase I epilepsy surgery evaluation, and so can be readily integrated into the standard pre-operative workflow of any comprehensive epilepsy center.

This is still preliminary data and any hypotheses about the exact mechanism of this negatively correlated epilepsy network still need to be confirmed in future studies by applying the thresholds calculated with the ROC analysis in an out-of-sample test group to see if the prediction holds. As set forth in FIG. 4, also, there has been much work on multivariate predictive models in epilepsy surgery (25, 26). In the future this unique connectivity metric may be able to add to the predictive value of these models. This process includes continuing to collect data and build a larger database in the hopes of finding more subtle changes between our subgroups. Other options may incorporate including additional data such as semiology and PET scan to better define network characteristics. These network imaging results will be discussed in the multi-disciplinary evaluation for epilepsy surgery in an effort to generate prospective, out-of-sample data to substantiate the conclusions of this study. One goal of this type of research would be to strengthen the argument that network analysis can be a valuable tool in predicting which patients will benefit from resective surgeries.

While not detracting from the results presented here, some limitations to the applicability of this data should be considered. When undergoing rsfMRI imaging, this disclosure did not control for the presence of anti-epileptic drugs. It is possible that these drugs may inhibit certain neuronal processes and affect rsfMRI signal patterns, and it is unknown how these drugs would affect the results.

A number of embodiments of the disclosure have been described. Nevertheless, it will be understood that various modifications may be made without departing from the spirit and scope of the invention. By way of non-limiting illustration, examples of certain embodiments of the present disclosure are given below.

EXAMPLES

Methods

Scalp EEG and rsfMRI were collected from 19 patients with unilateral temporal lobe epilepsy and used to map the hypothesized irritative zone. Using patients' rsfMRI, the negatively correlated epilepsy network was mapped and connectivity within the network was determined both pre- and post-operatively. Neuropsychological function was also assessed pre- and post-operatively and was compared to the connectivity within the brain regions negatively correlated with the epilepsy network.

All reported data followed the Strengthening the Reporting of Observational studies in Epidemiology (STROBE) guidelines for observational trials and was approved by our university's Institutional Review Board (IRB). Epileptic networks were modeled in nineteen patients with unilateral TLE who underwent open microsurgery directed towards the anterior/mesial temporal lobe. The patients included in this study represent a series of patients with TLE who signed consent and agreed to participate in this study between May 2017 and March 2020. They underwent this pre-operative network assessment and surgery at our tertiary referral center (Table 1). Each patient underwent a standard pre-surgical evaluation for epilepsy surgery including MRI, epilepsy monitoring unit (EMU) video-EEG, Wada testing, ($^{18}$F-FDG) PET, and neuropsychological testing. Surgery planning and post-surgical evaluation not related to network analysis were conducted by a care team blinded to the epileptic network modeling results.

In the cohort of 19 patients with unilateral TLE, five (26%) were male and 14 (74%) were female. All underwent the complete phase 1 evaluation described in the methods, with three (16%) of those patients undergoing subsequent phase II invasive monitoring (stereo-electroencephalography or subdural strips/grids) for further clarification of epileptogenic focus localization. Fifteen (79%) patients were determined to have seizures originating from the left temporal lobe with the remaining four (21%) having seizures in the right temporal lobe. All patients underwent microsurgical resection with either selective amygdalohippocampectomy (n=13) or temporal lobectomy with amygdalectomy and minimal hippocampal resection (n=6). After surgery, ten (53%) had tissue specimen proven hippocampus sclerosis. All patients were followed for at least one year after surgery, and with an average time to follow-up of 24 months. Demographic information is also shown in Table 1. All 19 patients had the negatively correlated epilepsy network mapped, and the surgery planning team was blinded to the results of the network result.

EEG and rsfMRI were obtained on separate hospital visits as part of a standard pre-surgical evaluation. EEG was acquired with 24 scalp electrodes in a standard International 10-20 configuration during the pre-operative EMU (Epilepsy Monitoring Unit) session. rsfMRI was conducted in a 3-Tesla MRI with a blood oxygenation level dependent (BOLD) MRI sequence. rsfMRI was acquired with the patient lying supine with eyes closed. The rsfMRI sequence consisted of a single five-minute acquisition with parameters as follows: echo time (TE) of 35 ms, repetition time (TR) of 3000 ms, and a voxel size of 4×3.75×3.75 mm. Volumetric T1-weighted thin slice MRI was acquired during the same session. The post-operative MRI was conducted four months after the surgery to allow the acute surgery-related MRI signal to dissipate and not affect the results.

In the cohort of 19 patients with unilateral TLE, five (26%) were male and 14 (74%) were female. All underwent the complete phase 1 evaluation described in the methods, with three (16%) of those patients undergoing subsequent phase II invasive monitoring (stereo-electroencephalography or subdural strips/grids) for further clarification of epileptogenic focus localization. Fifteen (79%) patients were determined to have seizures originating from the left temporal lobe with the remaining four (21%) having seizures in the right temporal lobe. All patients underwent microsurgical resection with either selective amygdalohippocampectomy (n=13) or temporal lobectomy with amygdalectomy and minimal hippocampal resection (n=6). After surgery, ten (53%) had tissue specimen proven hippocampus sclerosis. All patients were followed for at least one year after surgery, and with an average time to follow-up of 24 months. Demographic information is also shown in Table 1. All 19 patients had the negatively correlated epilepsy network mapped, and the surgery planning team was blinded to the results of the network result.

Results

Figure 3A:
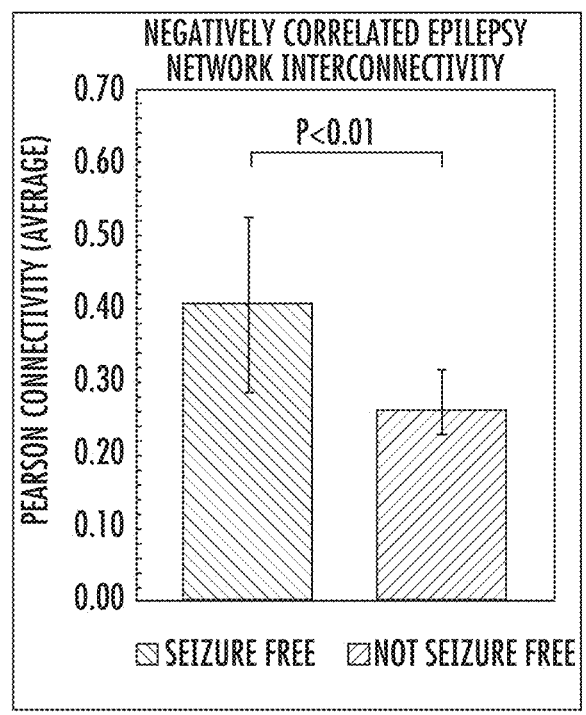
FIG. 3A illustrates that patients who are seizure free after surgery are more likely to have a highly connected and less spread out network.
Figure 3B:
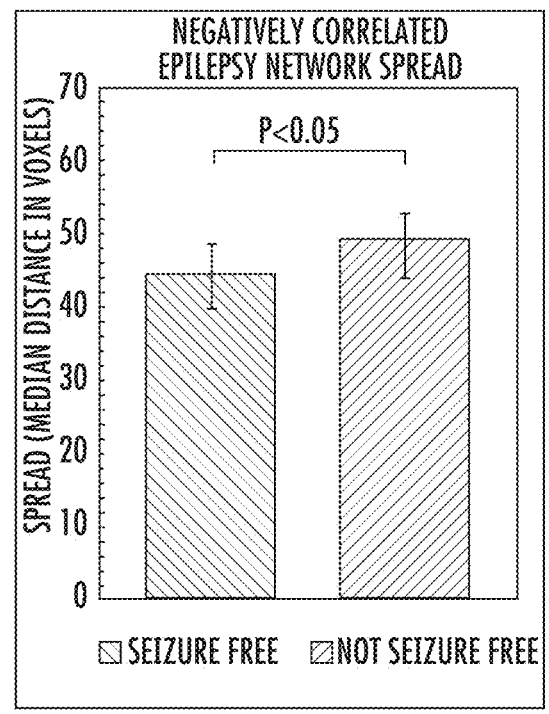
FIG. 3B illustrates that patients who are seizure free after surgery are more likely to have a highly connected and less spread out network.

Pre-operatively, connectivity within the negatively correlated network was inversely related to the spread (diffuseness) of that network (R=−0.678, p<0.001), and positively associated with higher baseline verbal and logical memory. Pre-operative connectivity within the negatively correlated network was also significantly higher in patients who would go on to be seizure free (p=0.0086), and a Pearson correlation value over 0.2728 predicted seizure freedom with specificity of 71% and sensitivity of 79%. These results are illustrated in FIGS. 3A and 3B.

Significance

Patients with higher connectivity within brain regions negatively correlated with the epilepsy network had higher baseline memory function, narrower network spread, and were more likely to be seizure free after surgery. These data suggest that a highly connected negatively correlated network may be used to predict better surgical outcomes, both in terms of seizure freedom and neurocognitive function. The negatively correlated epilepsy network is newly described. Negatively correlated network may help predict seizure-free outcomes. High pre-operative connectivity within the network was predictive of better cognitive function.

The epilepsy network for each patient was modeled similar to what is previously described (13). Briefly, all MR image sets were motion corrected, smoothed, and transformed into Montreal Neurological Institute (MNI) space using the six-parameter rigid body spatial transformation algorithm and co-registered using SPM12 (Wellcome Department of Imaging Neuroscience, University College London, UK). The scalp EEG data were filtered to remove non-physiologic frequencies and cropped to include only the inter-ictal or ictal signals identified by a blinded neurophysiologist (MATLAB 2019b, Natick, Mass.). Ictal and interictal source discharges were localized by first generating a transformed mesh from the thin-slice T1-weighted MRI sequence. Then, cortical dipoles were modeled using a forward computation that was followed by an empirical Bayesian approach to inverse reconstruction, localizing the theoretical evoked response (SPM12). This process was used to generate a hypothesized epileptogenic zone source volume, which was co-registered to the rsfMRI in MNI space.

The rsfMRI time-series signature was extracted from the epileptogenic zone volume and individual intra-axial image voxels in order to generate a Pearson correlation coefficient for each voxel with respect to the epileptogenic zone. In previous studies using this algorithm, the epilepsy network was defined as the collection of voxels that had an above-threshold Pearson correlation, with the threshold defined as the average Pearson correlation coefficient for each patient, so that all volumes generated were positively correlated with the epileptogenic zone. This type of analysis was done in the present study to generate an epilepsy network, but the primary aim of this study was to investigate the negatively correlated regions, so the inverse epilepsy network was defined as the voxels that had a Pearson correlation value less than −0.4. The threshold −0.4 was selected to standardize the analysis between patients, which has been shown to have a high sensitivity for detecting nodes within brain networks (23, 24). Similar to our prior studies, interconnectivity within this unique network was calculated by determining the correlation matrix for all the voxels involved in the inverse epilepsy network and computing an average value. Similarly, post-operative connectivity within the modeled network was determined by calculating the mean Pearson connectivity coefficient within the network when the same set of voxels were overlaid on the post-operative rsfMRI image set. The network was mapped without prior knowledge of any parameters in the rsfMRI for each patient and is not related to any anatomical or functional atlas. Two examples, one of a negatively-correlated that is more diffuse (FIG. 1A) and one that is highly organized and synchronized (FIG. 1B) are shown.

Pre-operatively, 19 patients had comprehensive neuropsychological assessment following NIH Epilepsy common data elements recommendations that quantify aspects of cognition including declarative memory, attention/executive, language, and visuo-constructional functions as well as general intellectual ability. Quality of life and mood status was also obtained. Pre- and post-operative data were available for a subset of patients (n=13) because data from the remaining patients are still being collected and processed. Testing and scoring were conducted by clinicians blinded to the network modeling results. Subtests of the Wechsler Memory Scale-4$^{th}$ Ed. (WMS-IV) analyzed immediate or delayed logical memory (LM-I & LM-II) and immediate or delayed visual reproduction (VR-I & VR-II), a measure of visual memory. The Rey Auditory Verbal Learning Test short-delay (RAVLT Trials 6) and long-delay (RAVLT 7) was used to measure auditory-verbal memory, rate of learning, learning strategies, retroactive and proactive interference, the presence of confabulation of confusion in memory processes, retention of information, and differences between learning and retrieval. Both RAVLT 6 & 7 and LM-I & II are tests that measure verbal memory. Verbal fluency was measured using the Controlled Oral Word Association (FAS) and semantic fluency was measured using the Animal Naming Test. Word retrieval was measured using the Boston Naming Test (BNT). The Ruff Figural Fluency Test (RFFT) evaluated nonverbal mental flexibility, initiation, planning, and divergent reasoning. Finally, each patient completed the Wechsler Adult Intelligence Scale-4$^{th}$ Ed (WAIS-IV) prorated full-scale intelligence index. Raw scores for all neuropsychological tests except for WAIS-IV IQ scores were used in analyses.

A two-sample t-test was used to compare independent groups with continuous variables. P-values less than α=0.05 were considered significant. Spearman Rho correlation analysis was used to compare network connectivity to neuropsychometric testing results. Network modeling statistical tests were conducted using IBM SPSS Statistics Version 26 (IBM Corp., Armonk, N.Y., United States).

This disclosure compared the connectivity, defined as the average of all the Pearson correlation values between every voxel within the respective network, between the negatively correlated network and the positively correlated epilepsy network. Across all patients, the degree of connectivity within each of these networks was not significantly correlated (R=−0.068, p=0.771), suggesting that connectivity within the negatively correlated epilepsy networks and within the positively correlated epilepsy networks are independent variables. Next, the connectivity between the voxels of the negatively correlated network (the "interconnectivity" of the network) was compared to the average connectivity between the individual voxels to the epileptogenic zone (negative correlation to the seed volume) and found to be not significantly related (R=0.030, p=0.921). This suggested that the interconnectivity metric is independent from the negative correlation observed between the voxels of the network and the epileptogenic zone.

The spread of the negatively correlated epilepsy network was defined as the median Euclidean distance of each voxel within the network from the centroid of the hypothesized epileptogenic zone generated from the EEG source localization. The interconnectivity of the negatively correlated epilepsy network was significantly correlated to the spread of the network, such that the more highly interconnected the network, the less it was spread out across the brain (R=−0.678, p<0.001). A scatter plot of the network spread and interconnectivity is shown in FIG. 2.

Neuropsychological function was measured pre-operatively in these patients and performance was compared to the connectivity within the negatively correlated epilepsy network. We found that both immediate and delayed visual memory function were higher in patients with a more interconnected negatively correlated network (VRI R=0.522, p=0.022; VRII R=0.517, p=0.024). No other significant correlations were found pre-operatively.

Neuropsychological function was also measured post-operatively for comparison to the pre-operative level. The system obtained a "difference score"—defined as the post-operative score minus the pre-operative score—such that higher difference scores correlate to relatively higher function post-operatively, and conversely lower scores representing a drop in these objective measures of cognition. A negative correlation was observed between the difference score for naming and the pre-operative connectivity within the negatively correlated epilepsy network, suggesting that patients with more interconnected negatively correlated epilepsy networks are more likely to experience a larger decrease in their naming function (BNT R=−0.570, p=0.05). However, it should be noted that the pre-operative performance on the same test was not significantly correlated with negatively correlated epilepsy network connectivity (R=0.337, p=0.158), suggesting that the correlation of the difference in score was not likely related to a baseline deficit in the patients with less interconnected networks.

As of the most recent follow-up (range: 14-36 months), seven patients (37%) were not seizure free (Engel Class II, III, IV), and 12 patients (63%) were seizure free (Engel Class I). The connectivity within the pre-operative positively correlated epilepsy network was not significantly different between patients that were seizure free and those that were not (p=1.00). However, the pre-operative connectivity within the negatively correlated network was significantly higher in patients who went on to be seizure free (p=0.0086) (FIG. 3A). Also, spread of the network (median distance) was significantly lower in patients who were seizure free compared to those who were not (p=0.0132) (FIG. 3B).

Figure 4:
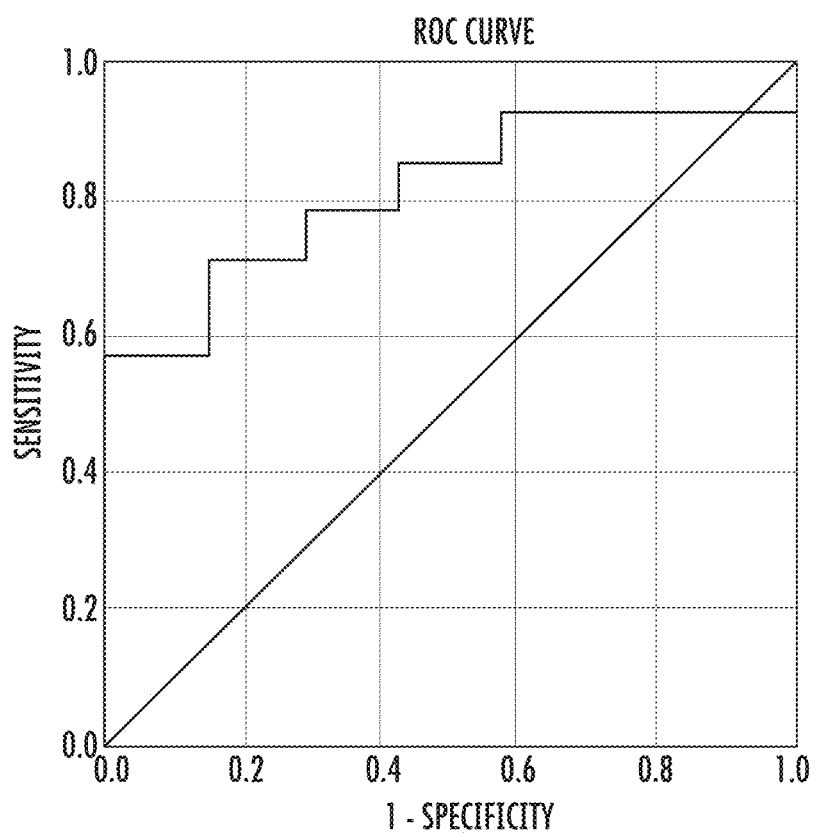
FIG. 4 is a graphical representation showing predictive value of the negatively correlated epilepsy network that was also investigated. A receiver operating characteristics (ROC) curve was created.

The predictive value of the negatively correlated epilepsy network was also investigated. A receiver operating characteristics (ROC) curve was created. The area under the curve was determined to be 0.816 with the 95% confidence interval ranging from 0.633-0.999. The connectivity threshold that maximized specificity and sensitivity was 0.2728 (specificity 71%, sensitivity 79%). A threshold of 0.2312 maximized sensitivity (specificity 43%, sensitivity 93%) and a threshold of 0.3781 maximized specificity (specificity 100%, sensitivity 57%). The ROC curve is shown in FIG. 4.

TABLE 1

Demographics

| Patient Number | Gender | Age at Surgery | MTS (Tissue Specimen) | Surgery Side | Dominant Hemisphere (Wada) | Seizure Free |
|---|---|---|---|---|---|---|
| 1 JK | Male | 26 | Yes | Left | Left | No |
| 2 KA | Male | 17 | No | Left | Right | No |
| 3 KB | Female | 26 | No | Right | Left | No |
| 4 LF | Female | 35 | No | Left | Left | No |
| 5 MA | Female | 32 | No | Left | Right | No |
| 6 SC | Female | 40 | No | Right | Left | No |
| 7 YV | Female | 36 | No | Left | Left | No |
| 8 BJC | Female | 47 | Yes | Left | Left | Yes |
| 9 DS | Male | 23 | N/A | Left | Left | Yes |
| 10 EIG | Female | 34 | Yes | Left | Right | Yes |
| 11 IAM | Female | 19 | Yes | Right | Left | Yes |
| 12 IM | Female | 40 | Yes | Right | Left | Yes |
| 13 JN | Male | 26 | Yes | Left | Left | Yes |
| 14 LRL | Female | 33 | Yes | Left | Left | Yes |
| 15 MW | Male | 32 | No | Left | Left | Yes |
| 16 NPR | Female | 28 | Yes | Left | Left | Yes |
| 17 OAS | Female | 24 | No | Left | N/A | Yes |
| 18 SLG | Male | 25 | Yes | Left | Left | Yes |
| 19 TH | Female | 53 | Yes | Left | Left | Yes |

A computerized method of modeling a human brain includes acquiring electroencephalogram (EEG) data corresponding to the human brain and additionally acquiring resting state functional magnetic resonance imaging (rsfMRI) data corresponding to the human brain. The EEG data and the rsfMRI data may be gathered simultaneously or non-concurrently, depending on the equipment in use. The method continues by identifying ictal source discharges and interictal source discharges within the EEG data from respective regions of the human brain. The method has a step of tagging predicted source volumes of epileptogenic zones from the respective regions of the human brain and co-registering the predicted source volumes to the rsfMRI data. The co-registering may be completed in Montreal Neurological Institute (MNI) space.

The computerized method continues by extracting time signatures from selected rsfMRI data corresponding to the predicted source volumes. The method also includes generating a Pearson correlation coefficient for image voxels from the selected rsfMRI data corresponding to the predicted source volumes and generating an inverse epilepsy network comprising image voxels in which the Pearson correlation coefficient is below a threshold value. The computerized method and associated system continue by identifying a level of interconnectivity within the inverse epilepsy network by determining a correlation matrix for all of the image voxels in the inverse epilepsy network and computing an average connectivity value. The average connectivity value includes an average of all the Pearson correlation values between every pair of image voxels within the inverse correlated network.

The methods and systems disclosed herein include generating a positively correlated epilepsy network including corresponding image voxels in which the Pearson correlation coefficient is above a threshold value. In one example, the threshold value is 0.4 for identifying positively correlated image voxels. In other words, this disclosure includes the concept of the positively correlated epilepsy network of the previously discussed and incorporated by reference U.S. Pat. No. 10,588,561, which includes regions of the brain that operate in sync or substantially synchronously, with an epileptogenic portion of the brain subject to seizure. This disclosure adds the inverse epilepsy network to a computerized model of the brain that is negatively correlated with the epileptogenic portion. For the inverse epilepsy network, the Pearson correlation coefficient is below a respective threshold value. In one example, the respective threshold value is −0.4 for identifying negatively correlated image voxels.

The inverse epilepsy network may be formed by extracting time signatures from intra-axial image voxels within the rsfMRI data corresponding to the predicted source volumes in addition to the image voxels of the source volumes. In one non-limiting method, the steps include tagging predicted source volumes, in part, by generating a transformed mesh from the rsfMRI data, modeling cortical dipoles from the transformed mesh, and identifying locations of the predicted source volumes in the human brain.

To give more information regarding the identification of source volumes, the system and method continue by overlaying the image voxels onto a post-operative rsfMRI image set and calculating a post-operative connectivity within the inverse epileptic network by calculating a mean Pearson connectivity coefficient between pairs of the image voxels. In the end, the systems and methods herein include modeling a human brain that has regions exhibiting temporal lobe epilepsy and including the inverse epilepsy network in the model.

In a system used to model a human brain, the system may include an epilepsy monitoring unit storing electroencephalogram (EEG) data in computerized memory, wherein the EEG data corresponds to electrical impulses in the human brain. The system also includes a magnetic resonance imaging machine storing resting state functional magnetic resonance imaging (rsfMRI) data in respective computerized memory, wherein the rsfMRI data corresponds to the human brain. The rsfMRI data may be T1 image data. At least one computer processor is in electronic communication with the computerized memory storing the EEG data and the respective computerized memory storing the rsfMRI data. The processor accesses software to perform a computerized method having the steps of identifying ictal source discharges and interictal source discharges within the EEG data from respective regions of the human brain; tagging predicted source volumes of epileptogenic zones from the respective regions of the human brain; co-registering the predicted source volumes to the rsfMRI data; extracting time signatures from selected rsfMRI data corresponding to the predicted source volumes; generating a Pearson correlation coefficient for image voxels from the selected rsfMRI data corresponding to the predicted source volumes; and generating an inverse epilepsy network comprising image voxels in which the Pearson correlation coefficient is below a threshold value. In some embodiments, tagging predicted source volumes further includes generating a transformed mesh from the rsfMRI data, modeling cortical dipoles from the transformed mesh, and identifying locations of the predicted source volumes in the human brain.

As noted herein, the system operates with equipment running a computerized method further including at least the step of generating an epilepsy network of image voxels in which the Pearson correlation coefficient is above a threshold value (i.e. a positively correlated network). The method further includes generating an inverse epilepsy network having corresponding image voxels in which the Pearson correlation coefficient is below a threshold value (i.e., a negatively correlated network). The system and method further include displaying on a computer, models of an epileptogenic zone in a brain, a positively corresponding epilepsy network and/or an inverse epilepsy network that is negatively correlated with the epilepsy network. The system may include hardware and software for identifying a level of interconnectivity within the inverse epilepsy network by determining a correlation matrix for all of the image voxels in the inverse epilepsy network and computing an average connectivity value.

In regard to determining the effectiveness of a resection area of surgery. The evaluation method may include overlaying the image voxels onto a post-operative rsfMRI image set and calculating a post-operative connectivity within the inverse epileptic network by calculating a mean Pearson connectivity coefficient between pairs of the image voxels.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

Figure 6:
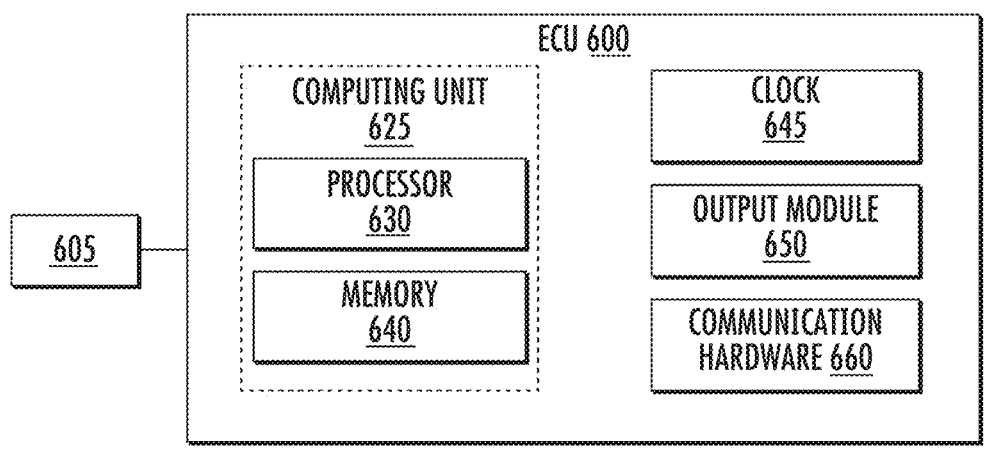
FIG. 6 is a schematic of example computer environments that may be used in the systems and methods of this disclosure.

Implementations described above and in relation to the figures may be used with equipment that implements computerized methods that are activated with an electronic control unit ("ECU") 600 in electronic communication with a sensor 605 as described herein. In particular, the described equipment, including imaging apparatuses and spectrometers, communicate with a computer processor configured to process one or more characteristics and/or profiles of the electrical signals received. By way of example and without limiting this disclosure to any particular hardware or software, FIG. 6 illustrates a block diagram of a system herein according to one implementation.

The ECU 600 may include a computing unit 625, a system clock 645, an output module 650 and communication hardware 660. In its most basic form, the computing unit 625 may include a processor 630 and a system memory 640. The processor 630 may be a standard programmable processor that performs arithmetic and logic operations necessary for operation of the sensor system 600. The processor 630 may be configured to execute program code encoded in tangible, computer-readable media. For example, the processor 630 may execute program code stored in the system memory 640, which may be volatile or non-volatile memory. The system memory 640 is only one example of tangible, computer-readable media. In one aspect, the computing unit 625 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 630 the machine becomes an apparatus for practicing the disclosed subject matter.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the vehicle computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

REFERENCES

1. Sander J W. The epidemiology of epilepsy revisited Curr Opin Neurol. 2003 April; 16:165-170.
2. Kwan P, Brodie M J. Early identification of refractory epilepsy N Engl J Med. 2000 Feb. 3; 342:314-319.
3. Schramm J Temporal lobe epilepsy surgery and the quest for optimal extent of resection: a review Epilepsia. 2008 August; 49:1296-1307.
4. Vale F L, Effio E, Arredondo N, Bozorg A, Wong K, Martinez C, et al. Efficacy of temporal lobe surgery for epilepsy in patients with negative MRI for mesial temporal lobe sclerosis J Clin Neurosci. 2012 January; 19:101-106.
5. Bell M L, Rao S, So E L, Trenerry M, Kazemi N, Stead S M, et al. Epilepsy surgery outcomes in temporal lobe epilepsy with a normal MRI Epilepsia. 2009 September; 50:2053-2060.
6. Engel J, Jr., McDermott M P, Wiebe S, Langfitt J T, Stern J M, Dewar S, et al. Early surgical therapy for drug-resistant temporal lobe epilepsy: a randomized trial JAMA. 2012 Mar. 7; 307:922-930.
7. Wiebe S, Blume W T, Girvin J P, Eliasziw M, Effectiveness, Efficiency of Surgery for Temporal Lobe Epilepsy Study G. A randomized, controlled trial of surgery for temporal-lobe epilepsy N Engl J Med. 2001 Aug. 2; 345:311-318.
8. Morgan V L, Rogers B P, Gonzalez H F J, Goodale S E, Englot D J. Characterization of postsurgical functional connectivity changes in temporal lobe epilepsy J Neurosurg. 2019 June 14:1-11.
9. Bernhardt B C, Hong S, Bernasconi A, Bernasconi N. Imaging structural and functional brain networks in temporal lobe epilepsy Front Hum Neurosci. 2013 Oct. 1; 7:624.

10. Bartolomei F, Wendling F, Chauvel P. [The concept of an epileptogenic network in human partial epilepsies] Neurochirurgie. 2008 May; 54:174-184.

11. Gonzalez H F J, Chakravorti S, Goodale S E, Gupta K, Claassen D O, Dawant B, et al. Thalamic arousal network disturbances in temporal lobe epilepsy and improvement after surgery J Neurol Neurosurg Psychiatry. 2019 October; 90:1109-1116.

12. Chauvel P, Gonzalez-Martinez J, Bulacio J. Presurgical intracranial investigations in epilepsy surgery Handb Clin Neurol. 2019; 161:45-71.

13. Neal E G, Maciver S, Vale F L. Multimodal, noninvasive seizure network mapping software: A novel tool for preoperative epilepsy evaluation Epilepsy Behav. 2018 April; 81:25-32.

14. Neal E G, Di L, Reale-Caldwell A, Maciver S, Schoenberg M R, Vale F L. Network connectivity separate from the hypothesized irritative zone correlates with impaired cognition and higher rates of seizure recurrence Epilepsy Behav. 2019 December; 101:106585.

15. Neal E G, Maciver S, Schoenberg M R, Vale F L. Surgical disconnection of epilepsy network correlates with improved outcomes Seizure. 2020 Jan. 29; 76:56-63.

16. Uddin L Q, Kelly A M, Biswal B B, Castellanos F X, Milham M P. Functional connectivity of default mode network components: correlation, anticorrelation, and causality Hum Brain Mapp. 2009 February; 30:625-637.

17. Li Q, Cao W, Liao X, Chen Z, Yang T, Gong Q, et al. Altered resting state functional network connectivity in children absence epilepsy J Neurol Sci. 2015 Jul. 15; 354:79-85.

18. Luo C, Yang F, Deng J, Zhang Y, Hou C, Huang Y, et al. Altered functional and effective connectivity in anticorrelated intrinsic networks in children with benign childhood epilepsy with centrotemporal spikes Medicine (Baltimore). 2016 June; 95: e3831.

19. McGill M L, Devinsky O, Kelly C, Milham M, Castellanos F X, Quinn B T, et al. Default mode network abnormalities in idiopathic generalized epilepsy Epilepsy Behav. 2012 March; 23:353-359.

20. Zhang Z, Lu G, Zhong Y, Tan Q, Liao W, Wang Z, et al. Altered spontaneous neuronal activity of the default-mode network in mesial temporal lobe epilepsy Brain Res. 2010 Apr. 6; 1323:152-160.

21. Blumenfeld H, McNally K A, Vanderhill S D, Paige A L, Chung R, Davis K, et al. Positive and negative network correlations in temporal lobe epilepsy Cereb Cortex. 2004 August; 14:892-902.

22. Morgan V L, Gore J C, Abou-Khalil B. Functional epileptic network in left mesial temporal lobe epilepsy detected using resting fMRI Epilepsy Res. 2010 February; 88:168-178.

23. van den Heuvel M, Mandl R, Hulshoff Pol H. Normalized cut group clustering of resting-state FMRI data PLoS One. 2008 Apr. 23; 3: e2001.

24. Shen X, Tokoglu F, Papademetris X, Constable R T. Groupwise whole-brain parcellation from resting-state fMRI data for network node identification Neuroimage. 2013 Nov. 15; 82:403-415.

25. Spencer S S, Berg A T, Vickrey B G, Sperling M R, Bazil C W, Shinnar S, et al. Predicting long-term seizure outcome after resective epilepsy surgery: the multicenter study Neurology. 2005 Sep. 27; 65:912-918.

26. Jehi L, Yardi R, Chagin K, Tassi L, Russo G L, Worrell G, et al. Development and validation of nomograms to provide individualised predictions of seizure outcomes after epilepsy surgery: a retrospective analysis Lancet Neurol. 2015 March; 14:283-290.

The invention claimed is:

1. A computerized method of modeling a human brain, the computerized method comprising:
    acquiring electroencephalogram (EEG) data corresponding to the human brain;
    acquiring resting state functional magnetic resonance imaging (rsfMRI) data corresponding to the human brain;
    identifying ictal source discharges and interictal source discharges within the EEG data from respective regions of the human brain;
    tagging predicted source volumes of epileptogenic zones from the respective regions of the human brain;
    co-registering the predicted source volumes to the rsfMRI data;
    extracting time signatures from selected rsfMRI data corresponding to the predicted source volumes;
    generating a Pearson correlation coefficient for image voxels from the selected rsfMRI data corresponding to the predicted source volumes;
    overlaying the image voxels onto a post-operative rsfMRI image set and calculating a post-operative connectivity within an inverse epilepsy network by calculating a mean Pearson connectivity coefficient between pairs of the image voxels;
    generating the inverse epilepsy network comprising image voxels in which the Pearson correlation coefficient is below a threshold value; and
    generating a model or mapping for surgical targeting or evaluation based, at least in part, on the generated inverse epilepsy network.

2. The computerized method of claim 1, further comprising identifying a level of interconnectivity within the inverse epilepsy network by determining a correlation matrix for all of the image voxels in the inverse epilepsy network and computing an average connectivity value.

3. The computerized method of claim 2, wherein the average connectivity value comprises an average of all the Pearson correlation values between every pair of image voxels within the inverse correlated network.

4. The computerized method of claim 1, further comprising generating an epilepsy network comprising corresponding image voxels in which the Pearson correlation coefficient is above a threshold value.

5. The computerized method of claim 4, wherein the inverse epilepsy network is negatively correlated with the epilepsy network.

6. The computerized method of claim 1, further comprising extracting time signatures from intra-axial image voxels within the rsfMRI data corresponding to the predicted source volumes.

7. The computerized method of claim 1, wherein tagging predicted source volumes further comprises generating a transformed mesh from the rsfMRI data, modeling cortical dipoles from the transformed mesh, and identifying locations of the predicted source volumes in the human brain.

8. The computerized method of claim 1, wherein the co-registering is completed in Montreal Neurological Institute (MNI) space.

9. The computerized method of claim 1, wherein the model of the human brain comprises regions exhibiting temporal lobe epilepsy.

10. The computerized method of claim 1, wherein the EEG data and the rsfMRI data are collected at different times.

11. The computerized method of claim 1, wherein the threshold is −0.4.

12. A system used to model a human brain, the system comprising:
- an epilepsy monitoring unit storing electroencephalogram (EEG) data in computerized memory, wherein the EEG data corresponds to electrical impulses in the human brain;
- a magnetic resonance imaging machine storing resting state functional magnetic resonance imaging (rsfMRI) data in respective computerized memory, wherein the rsfMRI data corresponds to the human brain;
- at least one computer processor in electronic communication with the computerized memory storing the EEG data and the respective computerized memory storing the rsfMRI data, the processor accessing software to perform a computerized method comprising the steps of:
- identifying ictal source discharges and interictal source discharges within the EEG data from respective regions of the human brain;
- tagging predicted source volumes of epileptogenic zones from the respective regions of the human brain;
- co-registering the predicted source volumes to the rsfMRI data;
- extracting time signatures from selected rsfMRI data corresponding to the predicted source volumes;
- generating a Pearson correlation coefficient for image voxels from the selected rsfMRI data corresponding to the predicted source volumes;
- overlaying the image voxels onto a post-operative rsfMRI image set and calculating a post-operative connectivity within an inverse epilepsy network by calculating a mean Pearson connectivity coefficient between pairs of the image voxels;
- generating the inverse epilepsy network comprising image voxels in which the Pearson correlation coefficient is below a threshold value; and
- generating a model or mapping for surgical targeting or evaluation based, at least in part, on the generated inverse epilepsy network.

13. The system according to claim 12, the method further comprising generating an epilepsy network comprising image voxels in which the Pearson correlation coefficient is above a threshold value.

14. The system according to claim 13, the method further comprising generating an epilepsy network comprising corresponding image voxels in which the Pearson correlation coefficient is below a threshold value.

15. The system according to claim 14, the method further comprising displaying on a computer, models of an epileptogenic zone of the human brain, the epilepsy network and/or the inverse epilepsy network that is negatively correlated with the epilepsy network.

16. The system according to claim 12, wherein tagging predicted source volumes further comprises generating a transformed mesh from the rsfMRI data, modeling cortical dipoles from the transformed mesh, and identifying locations of the predicted source volumes in the human brain.

17. The system according to claim 12, wherein the magnetic resonance imaging machine collects T1 image data.

18. The system according to claim 12, further comprising identifying a level of interconnectivity within the inverse epilepsy network by determining a correlation matrix for all of the image voxels in the inverse epilepsy network and computing an average connectivity value.

* * * * *